(No Model.)

E. C. FISHER.
BICYCLE TOOL.

No. 498,051. Patented May 23, 1893.

WITNESSES:
Arch. M. Catlin.
A. C. Rawlings

INVENTOR.
Edwin C. Fisher
by
Benj. R. Catlin ATTORNEY

THE NORRIS PETERS CO., PHOTO-LITHO., WASHINGTON, D. C.

UNITED STATES PATENT OFFICE.

EDWIN C. FISHER, OF CLAREMONT, NEW HAMPSHIRE.

BICYCLE-TOOL.

SPECIFICATION forming part of Letters Patent No. 498,051, dated May 23, 1893.

Application filed February 15, 1893. Serial No. 462,493. (No model.)

*To all whom it may concern:*

Be it known that I, EDWIN C. FISHER, a resident of Claremont, in the county of Sullivan and State of New Hampshire, have invented certain new and useful Improvements in Bicyclers' Tools; and I do hereby declare the following to be a full, clear, and exact description of the invention, such as will enable others skilled in the art to which it pertains to make and use the same.

The invention relates to a tool or implement suitable for bicyclers' use and has for its object to embody a wrench, pump and oil-can holder in one structure; and it consists in the matter hereinafter described and particularly pointed out.

Figure 1:
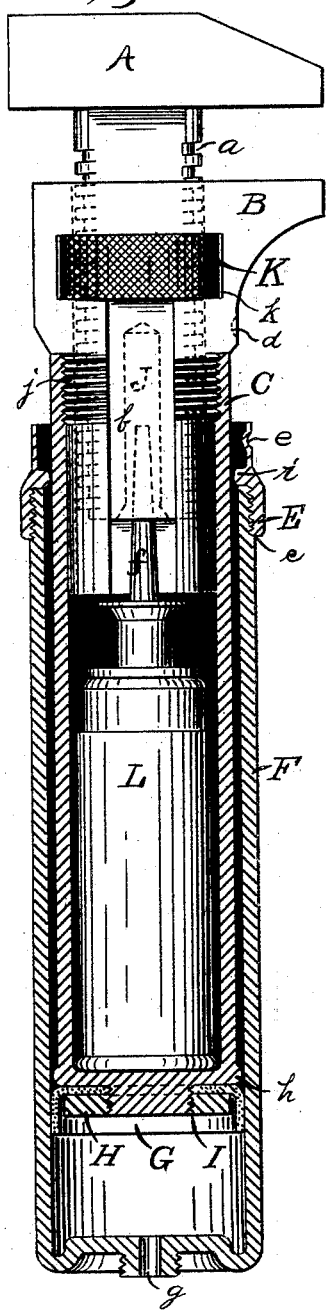
Figure 2:
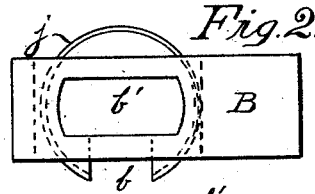
Figure 3:
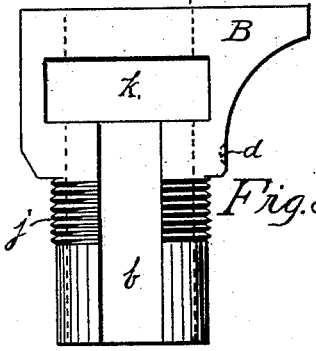
Figure 4:
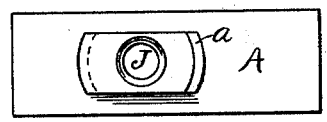
Figure 5:
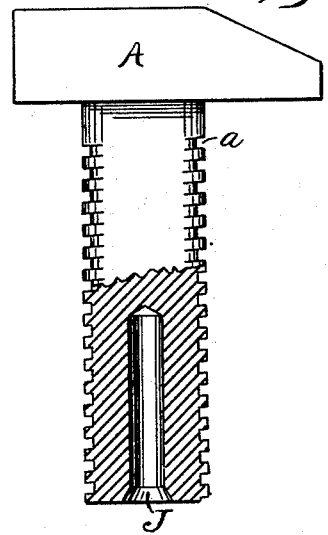

In the accompanying drawings Figure 1 is a partial longitudinal section of the device partly opened. Fig. 2 is a plan of the inner wrench jaw. Fig. 3 is a side elevation of the same; and Figs. 4 and 5 are respectively rear and side elevations of the front or outer jaw.

Reference letters A and B denote wrench jaws and $a$ a flattened screw threaded stem fixed to the jaw A and movable in the slot or recess $b'$ formed in jaw B. $b$ is a lateral slot in said jaw.

K indicates a milled nut situated in the transverse slot $k$ of the jaw B and provided with an annular screw threaded opening adapted to engage the threads formed on stem $a$. The stem $j$ of jaw B is made round and provided with screw threads to engage corresponding threads formed in the end of tubular plunger C. This plunger or piston has at its end opposite the wrench head a screw threaded extension or stem I adapted to receive a nut H for the purpose of securing to said piston an elastic washer or packing G. The piston is movable in a cylinder F which is provided with a screw threaded nozzle $g$ whereby connection is made directly or indirectly with the receptacle to be charged with air. In charging an elastic tubular tire with air it is usual to employ an intermediate flexible tube and in such case the tube would be attached to nozzle $g$. Suitable air valves can be provided in such pipe in any well known manner. In the construction illustrated air will enter about the packing G, when the piston is drawn toward the open end of the cylinder.

E indicates a ring having interior screw threads $c$ and a bearing rib $i$ and boss or projection $e$. This latter is formed in the outer part of ring E, the wall of which is made comparatively thin and by preference slightly elastic. When the cylinder F is fully closed by pushing its ring E upon the rear part of jaw B the projection $e$ is made to engage a corresponding countersunk depression $d$ in said jaw to lock the parts together. When the parts are thus adjusted the cylinder F constitutes the handle of the wrench and is adapted to be so used. At other times the cylinder F and piston C can be employed as a pump the wrench head being used as a handle. The bearing rib or ring $i$ and a similar ring $h$ formed on piston C obviate the danger of binding together the movable parts or of obstructing the space between them by dirt.

Within the hollow piston is placed an oil holder L having the usual nozzle or tip $f$. To provide room for this latter a hole J is formed in the stem $a$ of the jaw A. By removing the wrench head, which can be effected by unscrewing it at $j$, the oiling vessel is made accessible whenever desired.

By the herein described construction an air pump, wrench and oiler holder are provided in one structure with economy of space and material and in manner convenient for the use of wheelmen and others.

Various mechanical changes may be made without departing from the invention provided substantially the same principles of operation and construction are retained.

It will be noted that neither the usual handle of a wrench nor a piston rod of ordinary construction is employed, but a modified form of each and that these modified devices are combined in a manner to utilize the wrench head as a piston rod handle and to indirectly use said rod, through the medium of the pump cylinder, as a wrench handle with the effect to economize in space, weight and number of parts and to provide an implement that is adapted first to loosen the cap or plug of a charging inlet of a receptacle such as a pneumatic tire, then to charge the same and subsequently to secure in place the cap or plug, both the wrench and pump being adapted for their ordinary use in succession to effect a single general purpose, and both being adapted by their novel construction to be used simultaneously for the same purpose one as a handle and the other for effecting its special function.

Having thus fully described my invention, what I claim is—

1. An implement for the use of bicyclers and others comprising a wrench and a pump, the pump cylinder being adapted for use as a handle of the wrench and the wrench head as a handle for the piston rod of the pump, substantially as set forth.

2. A wrench having for its handle a pump comprising the exterior hollow cylinder and an interior cylinder and a locking device whereby the cylinders are secured when desired for use as a wrench handle, substantially as set forth.

3. A wrench having for its handle a pump comprising the exterior hollow cylinder and an interior cylinder and a locking device whereby the cylinders are secured when desired for use as a wrench handle, said locking device consisting in a boss formed in the outer cylinder or in an extension thereof and a countersunk seat for said boss formed in a jaw of the wrench, substantially as set forth.

4. A wrench having for its handle a pump comprising the exterior and interior hollow cylinder the inner one being adapted to receive an oil holder, substantially as set forth.

5. A wrench having for its handle a pump comprising the exterior and interior hollow cylinder, the inner one being adapted to receive an oil holder and having the stem of a wrench jaw bored out to receive the nozzle of said holder, substantially as set forth.

In testimony whereof I have signed this specification in the presence of two subscribing witnesses.

EDWIN C. FISHER.

Witnesses:
JAMES HOLT,
JOHN TYLER.